J. W. BRODERICK.
AIRSHIP.
APPLICATION FILED MAR. 29, 1909.
1,146,842. Patented July 20, 1915.
5 SHEETS—SHEET 2.
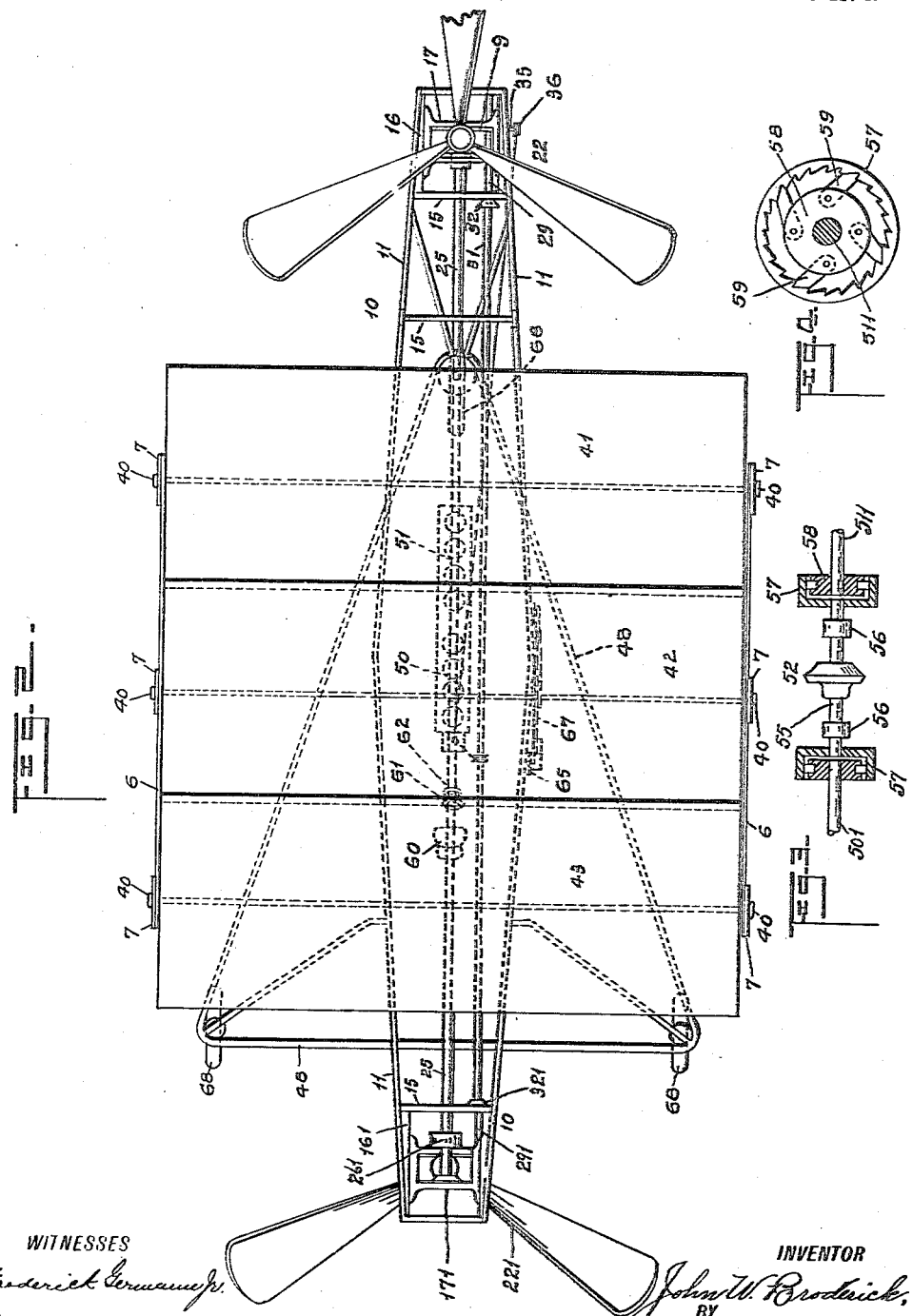
WITNESSES
Frederick Germann Jr.
Frances E. Blodgett
INVENTOR
John W. Broderick,
BY
Russell M. Everett,
ATTORNEY.

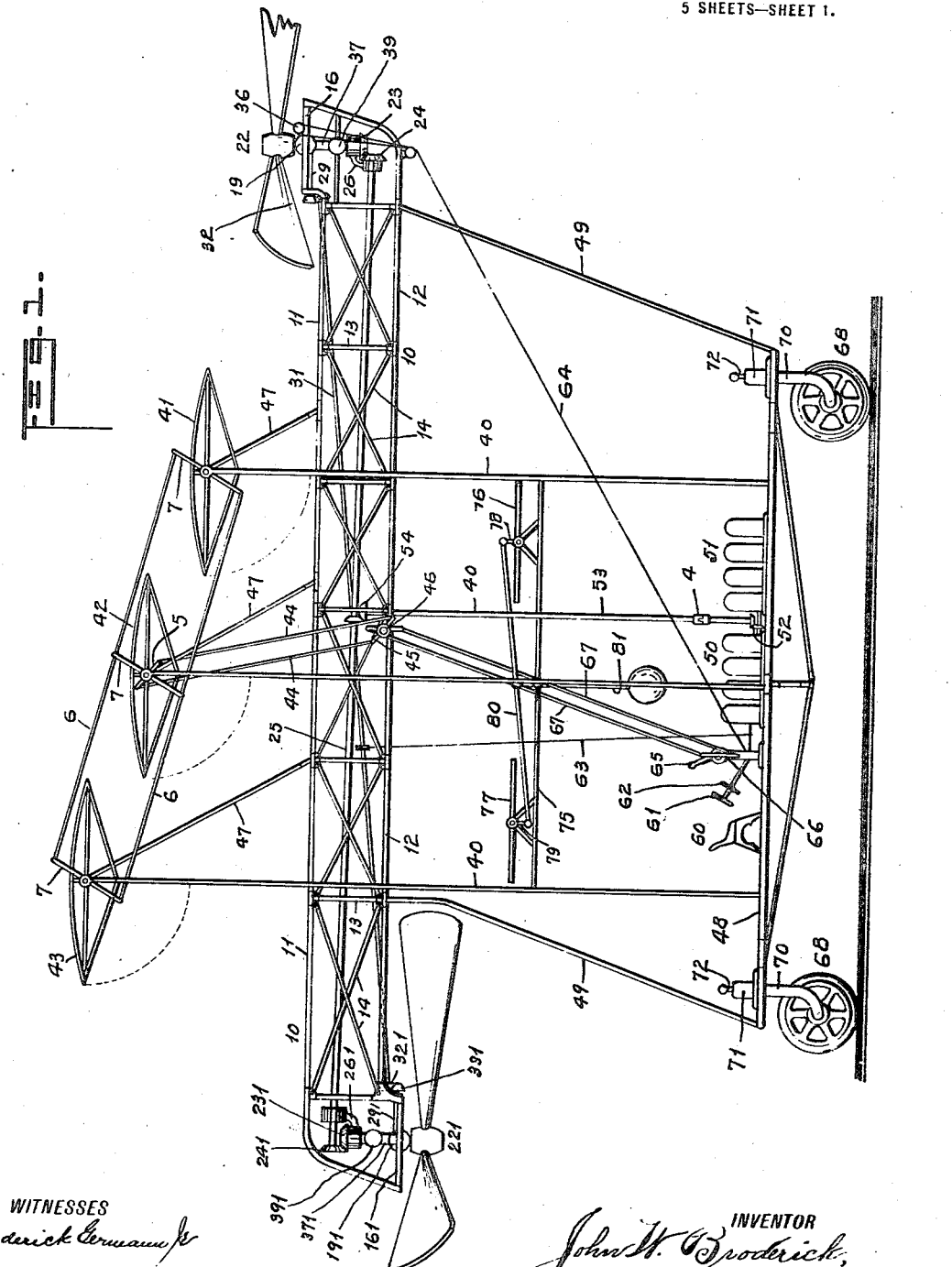

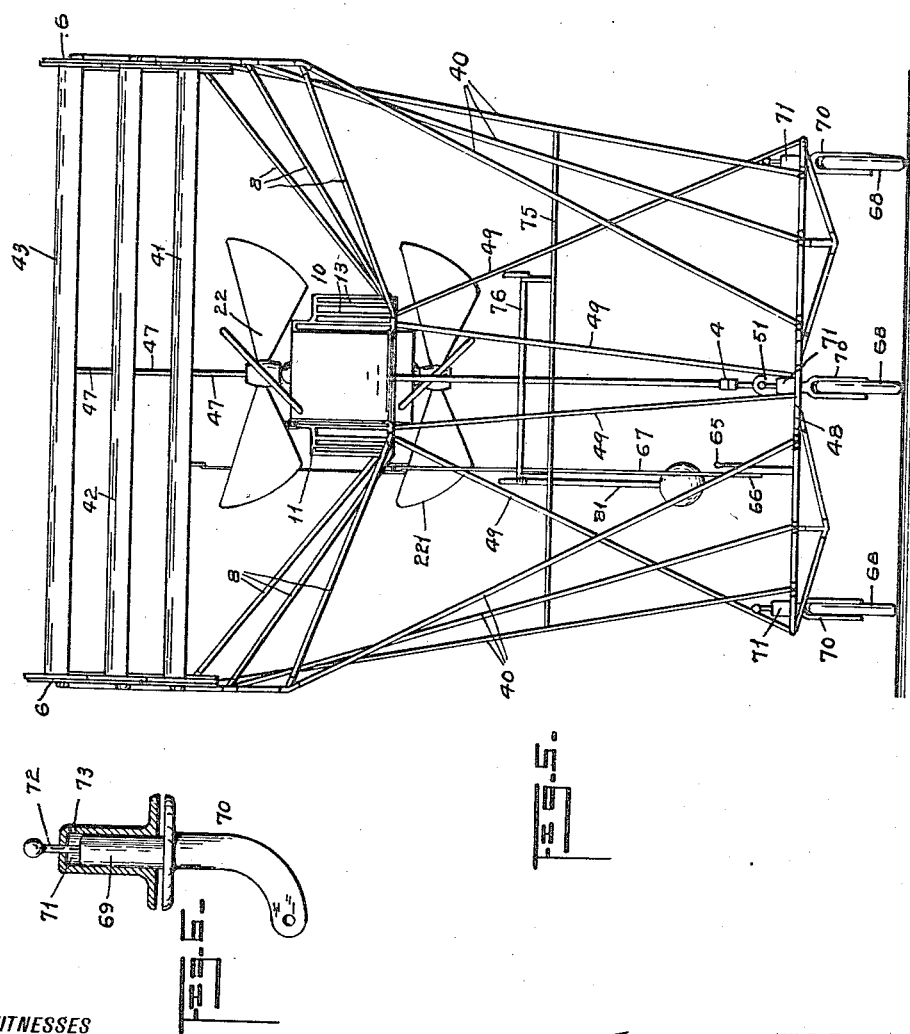

J. W. BRODERICK.
AIRSHIP.
APPLICATION FILED MAR. 29, 1909.
1,146,842.
Patented July 20, 1915.
5 SHEETS—SHEET 4.
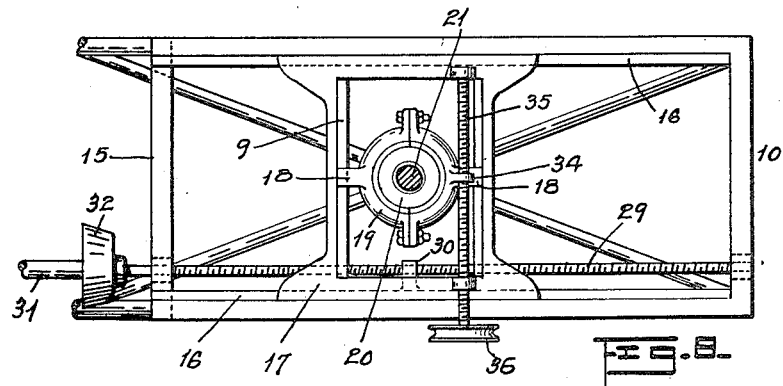
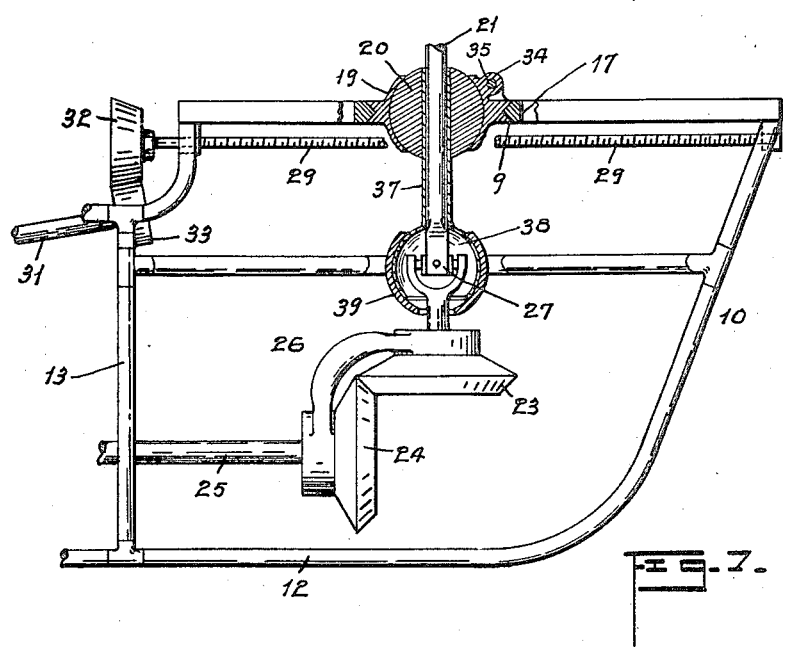
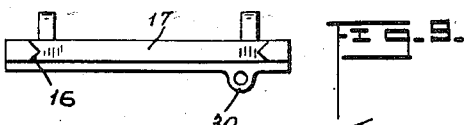
WITNESSES
INVENTOR
John W. Broderick,
BY
Russell M. Everett,
ATTORNEY.

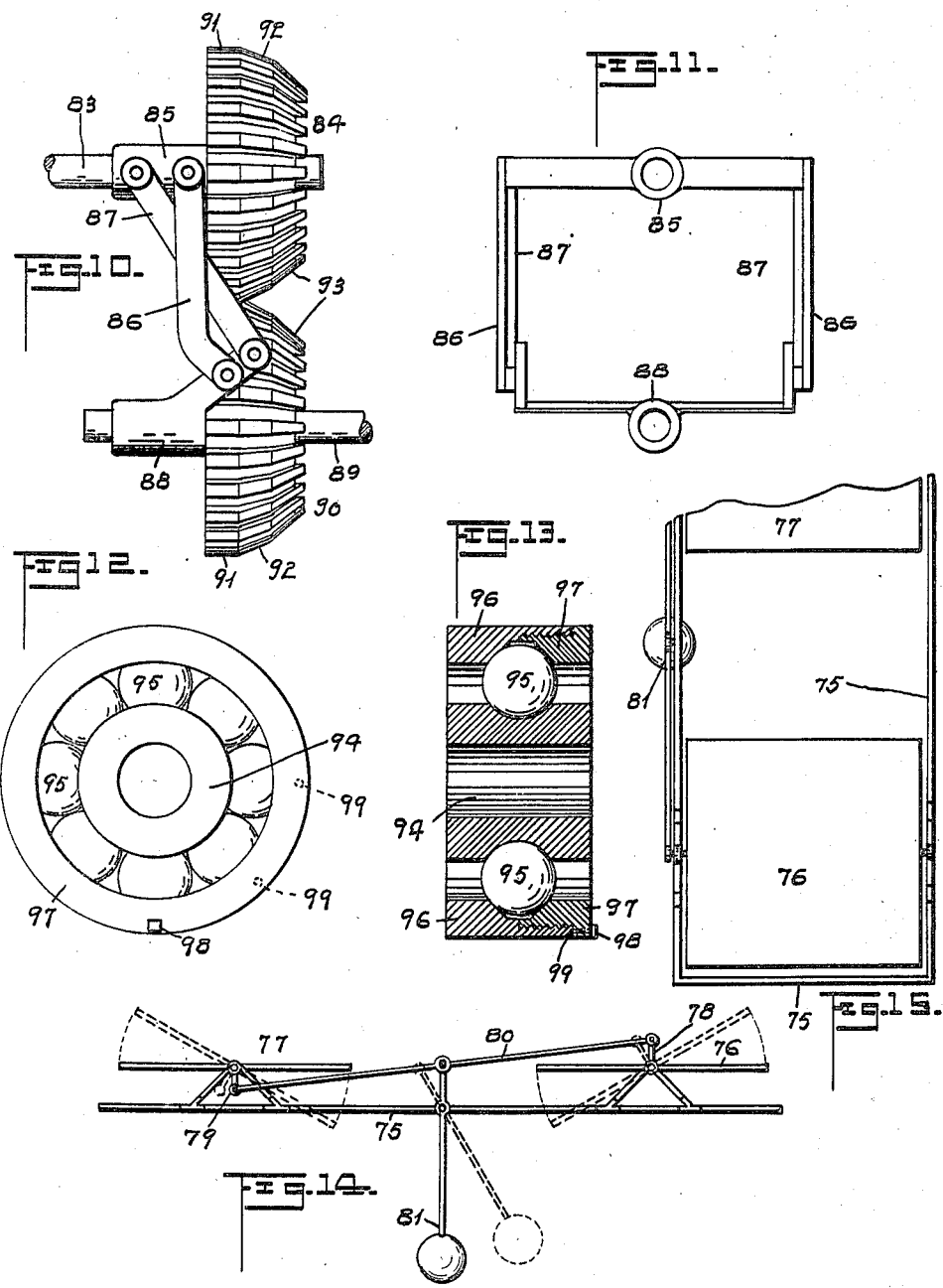

UNITED STATES PATENT OFFICE.

JOHN W. BRODERICK, OF NEWARK, NEW JERSEY.

AIRSHIP.

1,146,842.

Specification of Letters Patent. Patented July 20, 1915.

Application filed March 29, 1909. Serial No. 486,417.

*To all whom it may concern:*

Be it known that I, JOHN W. BRODERICK, a citizen of the United States, residing at Newark, in the county of Essex and State of New Jersey, have invented certain Improvements in Airships, of which the following is a specification.

This invention relates to that class of airships which are heavier than air, and the objects of the invention are to combine in a single machine a helicopter and an aeroplane; to provide in such an airship propellers whose axes can be shifted to either raise such a machine directly upward or drive the same horizontally; to provide means for shifting the axes of said propellers in unison; to enable said axes to be tipped from side to side to steer the machine to either the right or left; to provide planes for sustaining the weight of the car when traveling horizontally; to enable the said planes to swing into vertical position when the airship rises vertically, and to be slanted at different inclines as the machine travels horizontally; to prevent the airship from tilting endwise, and to retain the car in horizontal position, both as it travels and under abnormal conditions such as a gust of wind or the stopping of a propeller; to secure a construction in which the center of gravity of the machine and its occupant shall be below said propellers and planes; to provide two motors and means for connecting them to the driving shaft so that if either one stops the other will propel the airship; to provide air cushions for the landing wheels of the airship, and to obtain other advantages and results as may be brought out in the following description.

Referring to the accompanying drawings, in which like numerals of reference indicate corresponding parts in each of the several figures, Figure 1 is a side elevation of an airship of my improved construction; Fig. 2 is a plan of the same; Fig. 3 is a detail section of the connection of the motor to the driving mechanism, and Fig. 4 is an end view of the same; Fig. 5 is a front end elevation of the airship; Fig. 6 is a detail section of one of the landing wheel cushioning devices; Fig. 7 is a side elevation on larger scale of a portion of the front end of the airship, a certain propeller axis being in central longitudinal section; Fig. 8 is a plan of that part of the machine shown in Fig. 7; Fig. 9 is a rear end view of a certain sliding frame and its slideway; Fig. 10 is a side view of a modified form of power-transmitting bevel gears which may be employed, and Fig. 11 is an end view of the supporting means for said gears and their shafts; Fig. 12 shows in face view a ball bearing adapted to be used throughout the machine, and Fig. 13 is a central section of the same; Fig. 14 shows in side elevation the device for retaining the airship in horizontal position, and Fig. 15 is a plan of the same.

In said drawings, 10 indicates the body portion of my improved airship, comprising a light rigid framework. The said body portion is elongated, and slightly widest at its middle, tapering toward the ends, as shown in Fig. 2. Said body portion is shown as comprising top and bottom longitudinal side rods 11 and 12, connected by vertical side rods 13 and inclined braces 14, and by top and bottom horizontal cross rods 15. At the forward end of the airship said body portion 10 provides an upwardly facing normally horizontal slideway 16 and at its rear end a corresponding downwardly facing slideway 161. In each of these slideways is mounted a longitudinally movable frame 17 or 171, and said frame at the front end of the airship provides an interior transverse slideway. In this transverse slideway is mounted by arms 18, a hollow spherical bearing 19, which is adapted to receive a ball 20, in which is journaled a propeller axis 21 having a propeller 22 at its upper end. A similar propeller 221 is at the under side of the downwardly facing slideway 161 at the rear end of the body 10, and which rear propeller is mounted similarly to the forward one described, except that I have not shown means for moving it from side to side in a transverse slideway. At its end opposite the propeller, each axis or shaft therefor has a bevel gear 23, or 231, which meshes into a second bevel gear 24, or 241, fast on a shaft 25 extending longitudinally of the body 10. Brackets 26, or 261, each incloses at its opposite ends the shafts 21 and 25, or 211 and 25, adjacent to the bevel gears 23 and 24, or 231 and 241, to hold them in proper relative position.

Each propeller axis, as 21, has adjacent to its driving gear 23, or 231, and on the opposite side of its bearing in the bracket 26, or 261, therefrom, a universal joint, as 27. This joint permits the propeller 22, or 221, at the end of the axis, to be tipped by moving the slide in which said axis is supported, as has been described. In order to tip the propeller forward or backward, a screw shaft 29, or 291, is mounted in the frame of the slideway 16, or 161, and works through a tapped projection, as 30, on the frame 17, or 171. These two screw shafts 29 and 291 are turned simultaneously and at the same rate by means of a steering shaft 31 mounted in the body 10 and connected at its ends to the two shafts 29 and 291 by means of bevel gears or the equivalent. In the drawings, a gear 32 or 321 on the shaft 29, or 291, is shown meshing with another gear 33, or 331, on the steering shaft 31. By rotating the said steering shaft, therefore, the screw shafts 29 and 291 are turned to slide the frames 17 and 171 longitudinally of the body 10 and thus tip the propeller axes backward or forward. In carrying out my invention, these connections are such that the two propeller axes tip in opposite directions at the same time, that is to say while one is tipping forward the other is tipping rearward or vice versa.

The means for tipping the propeller axis from right to left or from side to side of the airship, is illustrated in connection with the forward propeller 22 in the drawings, though it will be obvious that both propellers could be arranged in the same way if desired. At said forward end of the machine, the hollow spherical bearing 19 is provided with a lateral tapped lug 34 which receives a threaded shaft 35 mounted transversely of the airship upon the frame 17 and longitudinally of the slideway 18 before described. Rotation of this screw shaft 35 is thus adapted to swing the propeller axis from right to left, and said screw shaft is shown as adapted to be rotated by means of a pulley 36 on one of its outer ends adapted to receive a belt or rope as hereinafter described.

It will be understood that in making an ascension with my improved flying machine, the axes of the two propellers stand vertical, as shown in Fig. 1, so that the whole effect of the said propellers is to carry the airship straight upward. When a desired height has been reached, the two propellers are tipped as has been described, the forward one in a forward direction and the rear one in a backward direction. The effect of such tipping is to cause the airship to move more or less horizontally according to the angle to which the two propellers have been tipped. Obviously if they were tipped until their axes were horizontal, the entire effect of the propellers would be to drive the airship horizontally, but at any position between the vertical and horizontal the power of the propellers is exerted partly to raise the machine and partly to move it horizontally. The result therefore would be that the airship will travel slantingly under usual conditions.

The two propellers 22 and 221 rotate in opposite directions, and thus their blades are oppositely arranged or inclined, as shown in Fig. 5.

Preferably each propeller axis has upon itself where it passes through its ball, as 20, a sleeve 37, or 371, which at its lower end is spherically enlarged as at 38, to fit in a coöperating spherical casing 39 or 391, mounted on the framework of the body portion 10, and inclosing the universal joint, as 27, of the axis.

The sidewise tipping of the propeller 22 serves to steer the airship either to the right or to the left according as the propeller is tipped, and hence whether only one propeller is tipped as shown, or both of them, is immaterial as to the nature of the effect, but of course much more rapid or quick turning can be obtained by having both propellers tipped.

From the sides of the body portion 10 braces 8 extend outward to rods 40 which are arranged in opposite pairs and extend both upward above the body portion and downward below the same. Between the upper ends of said rods 40 are pivoted the transverse planes 41 42 and 43, each plane being pivoted centrally of its ends between the two opposite rods 40 of the pair. Said planes are each preferably concavo-convex, with the rounded side upward, as shown, and are made rigid enough in any suitable manner to sustain the weight of the airship. These planes are rotatable, but are all connected or held in parallel relation by means of cross arms 7 on the shafts of the planes and rods 6 to which said cross arms are pivoted. One of the planes has a second cross arm 5 from the ends of which parallel rods 44, 44 extend downward to the ends of a cross arm 45 on an intermediate shaft 46 of the body 10, so that by turning said shaft 46 the planes 41, 42 and 43 can be turned. It will be understood that in making an ascension, or when the airship is to rise, the planes 41, 42 and 43 are turned into vertical position, so as to offer the least possible obstruction. When the airship travels horizontally, however, the planes are tipped at such an angle as best adapts them to aid in sustaining the weight of the machine upon ordinary and well understood principles.

It will be noted that the three planes, 41, 42 and 43 are disposed at different heights above the body 10 of the airship, the lowest plane being nearest the forward end of the machine. As a result of this, the planes act independently of each other in their effect on the atmosphere, and not as a single big plane. Braces 47 extend from the body portion of the machine upward to the cross shafts of the planes in any suitable manner.

As above stated the rods 40 extend downward below the body 10 of the airship and support a lower triangular framework or platform 48 which is substantially parallel to the said body 10 and adapted to support the motor and occupant of the machine. This platform 48 is at a considerable distance below the body 10, and the weight which it carries correspondingly lowers the center of gravity of the airship so that great stability is obtained. Besides the rods 40, the said platform 48 is supported by braces 49 extending from the front and rear of the platform directly to the body portion 10. Upon the said platform 48 are mounted two motors 50 and 51, each of which is adapted to drive through bevel gears 52 an upright shaft 53 which is connected by bevel gears 54 at its upper end to the drive shaft 25 of the body 10. Preferably a clutch of any suitable or ordinary type is placed in the said upright shaft 53 at a convenient point, as at 4, whereby the motors 50 and 51 may be disconnected.

The detail manner of connecting the two motors 50 and 51 to the upright shaft 53 is illustrated in Figs. 3 and 4 of the drawings, where 501 and 511 indicate the driving shafts of the two motors, and 55 is a separate piece of shafting in alinement therewith. This shaft 55 is mounted in bearings 56, 56 and has upon itself one of the pair of bevel gears 52 before referred to, the other being upon the upright shaft 53. Each end of the said shaft 55 carries a clutch member 57 which is adapted to coöperate with another clutch member 58 on the motor shaft. These clutches may be of any well-known construction, although for purposes of illustration I have shown one of them as 57 provided with interior ratchet teeth adapted to be engaged by pawls 59 on the other clutch member. By some such clutch means each motor runs independent of the other, and by having each motor capable of driving the airship, danger from the motors getting out of working order is greatly reduced.

The occupant of the airship sits at the rear of the motors, as at 60, and before him are steering wheels 61, 62 one of which controls a cable 63 leading to a pulley on the steering shaft 31 of the body 10, whereby the forward and rearward inclinations of the propellers are controlled, as above described. From the other steering wheel a belt or rope 64 extends to the pulley 36 on the screw shaft which tilts the propeller axis at the forward end of the airship toward either the right hand or the left. Also within convenient reach of the operator is a lever 65 projecting from a fulcrumal shaft having a cross arm 66 from the ends of which connecting rods 67 extend to the cross arm 45 on the intermediate shaft 46 on the body 10 as before described. This lever 65 thus enables the operator of the airship to control the planes 41, 42 and 43.

The bottom framework or platform 48 of the airship is provided with wheels or casters 68 which are adapted to support the machine upon the ground and enable it to move thereon. The construction of these landing wheels or casters is illustrated in Fig. 6, where 69 indicates the shank of the supporting bracket or fork 70 and which shank fits nicely in the socket 71. A slender extension 72 of the shank projects through a hole in the upper end closure of the socket 71 and is headed at its end to prevent withdrawal. A vent 73 is also provided in the top of the socket 71. When the airship is in the air, the landing wheels or casters will by their own weight drop downwardly in their sockets 71 as far as possible, the headed extension 72 limiting such movement. Then when the airship alights, its weight forces the shanks 69 back into the sockets 71, but the entrance of said shanks is cushioned by the air entrapped at their inner ends. A cushioning of the shock of landing is thus obtained.

In order to prevent dipping or endwise tilting of my improved airship when traveling horizontally through the air, I provide a horizontally disposed support 75 mounted between the rods 40 intermediate of the lower platform 48 and the body 10. Upon this support are pivoted upon horizontal transverse axes plates 76 and 77 whose axes have oppositely projecting arms 78 and 79 connected by rods 80. A pendulum 81 is then pivoted to the said support 75 or other suitable parts, and its upper end which projects beyond the point of pivoting is connected to the rod 80. If the airship tilts endwise the pendulum 81 swings accordingly and the plates 76 and 77 are thereby tilted into position where the impact of the air will best serve to right the airship. For instance, if the forward end of the airship dips, the pendulum would swing forward, which would tilt the front plate 76 upward at its forward edge and the rear plate 77 downward at its forward edge. The wind or air current due to the motion of the airship would thus strike the forward plate 76 from beneath and tend to raise it, while it would strike the rear plate 77 at its upper surface and tend to depress it. The effect of this would be to restore the airship to an even keel. Such a position of the plates as this is illustrated in outline in Fig. 14 of the drawings.

In Figs. 10 and 11 of the drawings I have illustrated a modified construction of means for transmitting motion to the propeller axes and at the same time allow them to tilt forward or backward. In said figures, 83 indicates the drive shaft of the body of the airship, having fixed upon itself the gear 84. Said shaft 83 is journaled adjacent to said gear in a fixed bearing 85, from the opposite ends of which, outside the periphery of the gear 84, depend pivotal links 86, 87 to a similar bearing 88 in which is journaled the propeller axis or shaft 89. Upon said propeller axis or shaft 89 is a gear 90 similar to the gear 84 and adapted to mesh therewith. The said gears 84 and 90 have three flattened surfaces adapted to mesh with each other at different times, the first or cylindric surfaces 91 meshing when the shafts 83 and 89 are parallel, the second or intermediate surfaces 92 meshing when the shafts are at an angle of forty-five degrees, and the third or last surfaces 93 meshing when the shafts are at right angles. Obviously, therefore, the propeller axis or shaft 89 may be tilted to various angular relations to the drive shaft 83, as is desired, in order to guide the airship upward or downward in its forward progress.

The power transmitting shafts of my improved airship are mounted in ball bearings of the type shown in Figs. 12 and 13, wherever necessary, the said bearings comprising an inner sleeve 94 grooved to receive the balls 95, and having outside of itself at a distance therefrom annular cones 96 and 97 adapted to screw together to engage the balls 95. When these two cone sections have been sufficiently tightened for the balls to take up any lost motion a screw 98 working through the cone section 97 is adapted to enter any one of a plurality of recesses therefor in the other cone section, as at 99.

Having thus described the invention, what I claim is:

1. In an airship, the combination with a horizontal elongated body portion, of oppositely facing vertical propellers at opposite ends of said body portion, means for driving said propellers in opposite directions, means for oppositely inclining said propellers either forward or backward with respect to the length of the body portion, and means for inclining one of said propellers toward either side of said body portion.

2. In an airship, the combination of an elongated body portion providing at its opposite ends oppositely facing slideways, slides in said ways adapted to slide longitudinally of the body portion, propeller shafts each pivotally mounted in said body portion adjacent to one of said slides and projecting therethrough, means for rotating said propeller shafts, and means for sliding said slides.

3. In an airship, the combination of an elongated body having at opposite ends oppositely facing slideways, slides in said ways, means for simultaneously sliding said slides in opposite directions, propeller shafts each pivotally supported on said body adjacent to one of said slides and having a bearing therein, means for rotating said propeller shafts, and propellers on said propeller shafts.

4. In an airship, the combination with a horizontal elongated body portion, of vertical propeller shafts projecting oppositely from said body portion adjacent to its ends, means for driving said propeller shafts in opposite directions, propellers on said propeller shafts, and means independent of each other for tipping both propeller shafts simultaneously in the direction of the length of the body portion and for tipping one of said shafts in a direction transverse to said body portion.

5. In an airship, the combination with an elongated body portion, of a propeller shaft projecting upward at one end of said body portion, a second propeller shaft projecting downward at the other end of said body portion, propellers on said propeller shafts, means for rotating said propeller shafts in opposite directions, and means for tilting each propeller shaft in the direction of the length of said body portion.

6. In an airship, the combination of upper supporting planes, rods pivotally carrying said planes depending therefrom at the point of pivoting, a platform at the lower ends of said rods, a motor on said platform, a seat for the operator on said platform, an elongated body portion between said supporting planes and platform substantially parallel thereto, means fixing said body portion to said planes independent of said rods, means fixing said body portion to the platform independent of said rods, propellers at opposite ends of said body portion, and means for driving said propellers from said motor.

7. In an airship, the combination with an elongated body portion, a propeller shaft projecting upward at the forward end of said body portion, a second propeller shaft projecting downward at the rear end of said body, propellers on said propeller shafts, means for rotating said propeller shafts, means for tilting each propeller shaft in the direction of the length of the body portion, a plurality of planes pivoted transversely of said body above the same intermediate of its ends, the forward plane being nearest said body and each of the other planes being farther from the body than its next adjacent forward plane, and means for swinging said planes on their pivots.

8. In an airship, the combination with a horizontal body portion, of propellers one at each end of said body portion and having a vertical axis, one of said propellers facing downward and the other upward, means for driving said propellers in opposite directions, means for inclining the axes of said propellers in the direction of the length of the body portion, and means for inclining the axis of one of said propellers toward either side of the body portion.

9. In an airship, the combination with a horizontal body portion, of propellers at the ends of said body portion having vertically disposed axes, one of said propellers facing downward and the other upward, means for driving said propellers, means for simultaneously inclining the axes of said propellers each toward the adjacent end of the body portion, and means for inclining the axis of one of said propellers toward either side of the body portion.

10. In an airship, the combination with a body portion, of a downwardly opening socket thereon having a vent near its upper end, a landing wheel bracket having a shank fitting said socket, an extension on said shank projecting slidably through the upper end of the socket, and means on said extension outside the socket adapted to prevent withdrawal of the shank from the socket.

11. In an airship, the combination of an elongated body portion, oppositely facing propellers at opposite ends of said body portion, means for varying the angular relation of said propellers with said body portion, upright rods at the sides of said body portion extending both above and below the same, braces connecting said rods to said body portion, a series of planes pivoted transversely of the body portion above the same between said rods, the forward plane being nearest said body portion and each succeeding rearward plane being farther from the body portion than its next adjacent forward one, a platform beneath said body portion at the lower ends of said rods, and a motor on said platform.

12. In an airship, the combination with an elongated body portion, of a series of planes pivoted transversely of said body portion above the same, the plane at one end of said series being nearest said body portion and each succeeding plane toward the other end being farther from the body portion than its next adjacent predecessor, and means for swinging said planes from horizontal to vertical position and vice versa.

13. In an airship, the combination with an elongated body portion, of a series of planes pivoted transversely of said body portion above the same, the forward plane being nearest said body portion and each succeeding rearward plane being farther from the body portion than the next adjacent forward one, and means for swinging said planes from horizontal to vertical position and vice versa.

JOHN W. BRODERICK.

In the presence of—
 RUSSELL M. EVERETT,
 FRANCES E. BLODGETT.